United States Patent [19]

Widener et al.

[11] Patent Number: 5,057,698
[45] Date of Patent: Oct. 15, 1991

[54] SHUNT CIRCUIT FOR REDUCING AUDIBLE NOISE AT LOW LOADING CONDITIONS OF A POWER SUPPLY EMPLOYING A HIGH FREQUENCY RESONANT CONVERTER

[75] Inventors: Steven R. Widener; George W. Oughton, both of Raleigh, N.C.

[73] Assignee: Exide Electronics, Raleigh, N.C.

[21] Appl. No.: 437,640

[22] Filed: Nov. 13, 1989

[51] Int. Cl.⁵ .................. H02J 9/00; H02M 3/335
[52] U.S. Cl. .................................. 307/66; 363/17; 363/79; 363/98; 363/28
[58] Field of Search .............. 363/17, 79, 90, 98, 363/132, 136, 28; 307/66

[56] References Cited

U.S. PATENT DOCUMENTS

| 4,071,812 | 1/1978 | Walker | 363/80 |
| 4,587,604 | 5/1986 | Nerone | 363/17 |
| 4,679,129 | 7/1987 | Sakakibara et al. | 363/17 |
| 4,691,273 | 9/1987 | Kuwata et al. | 363/17 |
| 4,727,469 | 2/1988 | Kammiller | 363/132 |
| 4,758,940 | 7/1988 | Steigerwald | 363/98 |
| 4,831,507 | 5/1989 | Colley | 363/21 |
| 4,876,635 | 10/1989 | Park et al. | 363/17 |
| 4,916,590 | 4/1990 | Petersen | 363/28 |

FOREIGN PATENT DOCUMENTS

299775 12/1988 Japan .

Primary Examiner—William H. Beha, Jr.
Attorney, Agent, or Firm—Woodcock Washburn Kurtz Mackiewicz & Norris

[57] ABSTRACT

A power supply including a resonant converter is provided with current shunt. The current shunt automatically shunts a portion of current flowing in the resonant converter at light loading of the power supply such that output current flowing in an output circuit connected to the power supply would be reduced toward zero as the operating frequency of the converter moves to a predetermined frequency.

23 Claims, 7 Drawing Sheets

SHUNT CIRCUIT FOR REDUCING AUDIBLE NOISE AT LOW LOADING CONDITIONS OF A POWER SUPPLY EMPLOYING A HIGH FREQUENCY RESONANT CONVERTER

BACKGROUND OF THE INVENTION

This invention relates to power supplies and, more particularly, to a power supply including a high frequency resonant converter having current shunting means.

The present invention will be described in association with an uninterruptable power supply (UPS) system as the invention was developed for such use, however, it is to be understood that the invention is not limited to such use. The invention may be used in other power supply systems utilizing resonant converters as will become evident hereinafter.

It may be explained here that high frequency series resonant converters are normally operated near their resonant frequency in order to deliver maximum power to the load in the output circuit to which they are connected. Furthermore, such series resonant converters have an operating frequency which varies directly with the loading of the output circuit. A the loading of the output circuit decreases, the operating frequency of the converter will drop and may result in the operating frequency falling within the audible frequency range, e.g., 16 to 20,000 Hz. UPS systems typically operate over a wide load range. Consequently, a UPS system employing a high frequency series resonant converter, absent correction, may exhibit objectional audible noise at lighter power levels.

SUMMARY OF THE INVENTION

It is a primary object of the present invention to provide a power supply utilizing a high frequency series resonant converter having an operating frequency which varies, depending on loading, and which operates without objectionable audible noise.

Briefly, and in accordance with the invention, a power supply is provided for supplying power to an output circuit. The power supply includes a resonant converter having an operating frequency which varies with the loading of the output circuit. Shunting means are also provided for automatically shunting a portion of the current flowing in the resonant converter as the loading of the output circuit decreases and the operating frequency moves toward a predetermined frequency such that the output current flowing in the output circuit would be reduced toward zero as the operating frequency moves to the predetermined frequency.

DESCRIPTION OF THE DRAWINGS

The foregoing and other objects and advantages of the invention will become more readily apparent from the following description of the preferred embodiment of the invention when taken in conjunction with the accompanying drawings which are a part hereof and wherein.

DESCRIPTION OF THE PREFERRED EMBODIMENT

Figure 1:
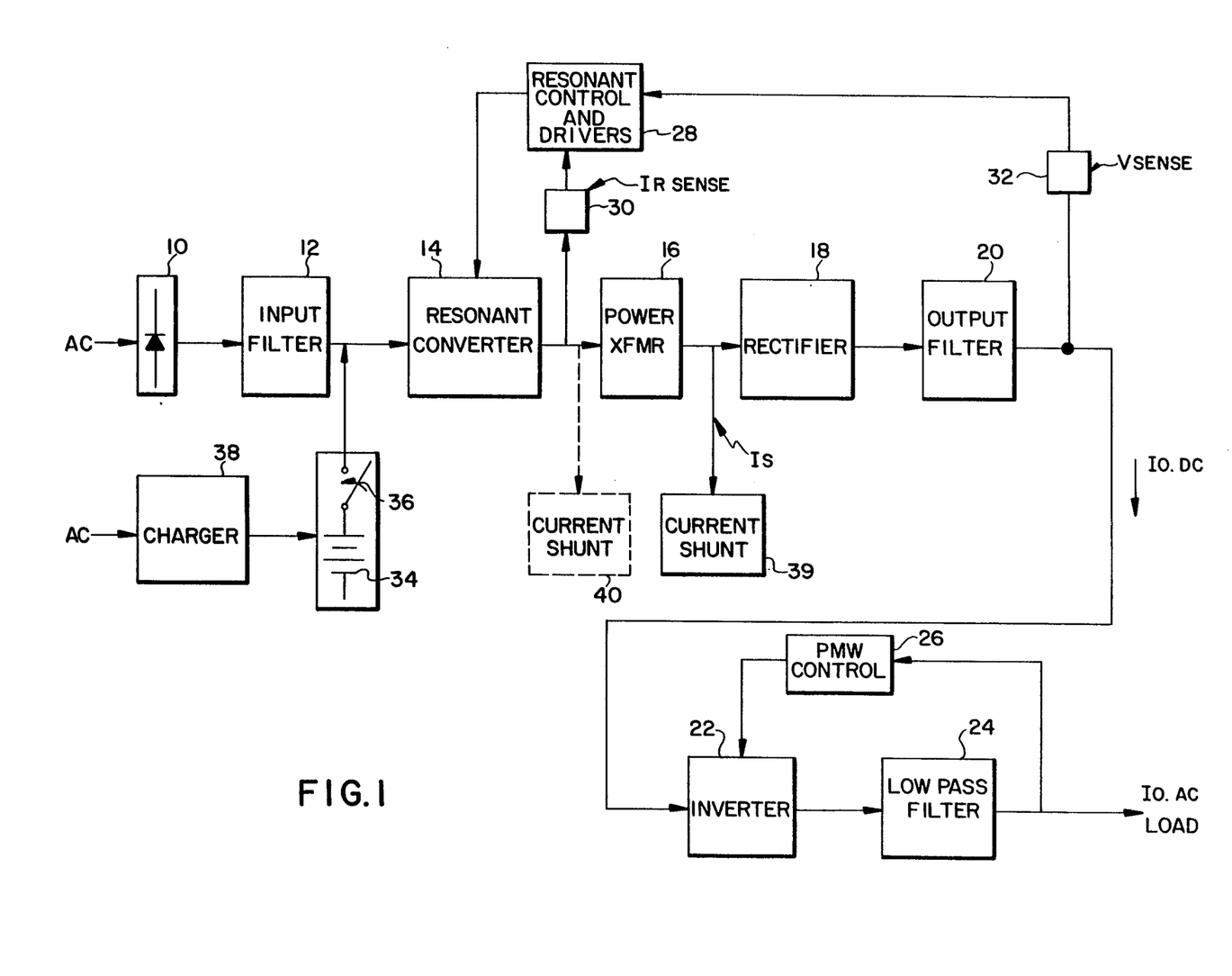
FIG. 1 is a block diagram showing a UPS system employing a high frequency resonant converter.

Referring now to the drawings wherein like reference numerals refer to like parts throughout the several views, FIG. 1 is a block diagram showing a UPS system.

The UPS system comprises a rectifier means 10 connectable to an AC utility power source designated AC in FIG. 1. The rectifier 10 provides a DC voltage to the input filter 12 which, in turn, provides unregulated DC voltage to the input of a high frequency resonant converter 14. The resonant converter provides regulated AC voltage at its output to an isolation power transformer 16. The power transformer 16 includes a primary winding and a secondary winding (both shown in FIG. 2) with the primary winding and the secondary winding coupling the converter 14 to the rectifier 18 which through output filter 20 supplies DC voltage to the PWM inverter 22. The PWM inverter 22 furnishes an AC voltage to the load connected to the UPS system through the low pass filter 24. Appropriate control circuitry is depicted in FIG. 1 for control of the PWM inverter 22 as illustrated by the block 26 and for control of the resonant converter 14 as illustrated by the block 28. Also depicted in FIG. 1 are sensing devices 30 and 32 for respectively, sensing the operating current IR of the converter 14 and the voltage at the output of the output filter 20. The UPS system shown in FIG. 1 also includes a battery 34 connectable to the input of the converter 14 through switch 36 and a charger 38 for the battery, which charger is also connected to an AC source.

The UPS system as just described does not in itself comprise applicants' invention and its operation will be readily understood to those skilled in the art. Further, the UPS system, as depicted in FIG. 1 and as thus far described, has been provided to illustrate the environment in which the present invention is suitably utilized as will become more evident as the description proceeds and in particular with reference to FIGS. 2, 3, 3A, 3B, 3C and 4. With further reference to FIG. 1, the current shunting means or current shunt in accordance with the invention is illustrated at block 39, or in the alternative at block 40, as it interconnects with the UPS system shown in FIG. 1.

Figure 2:
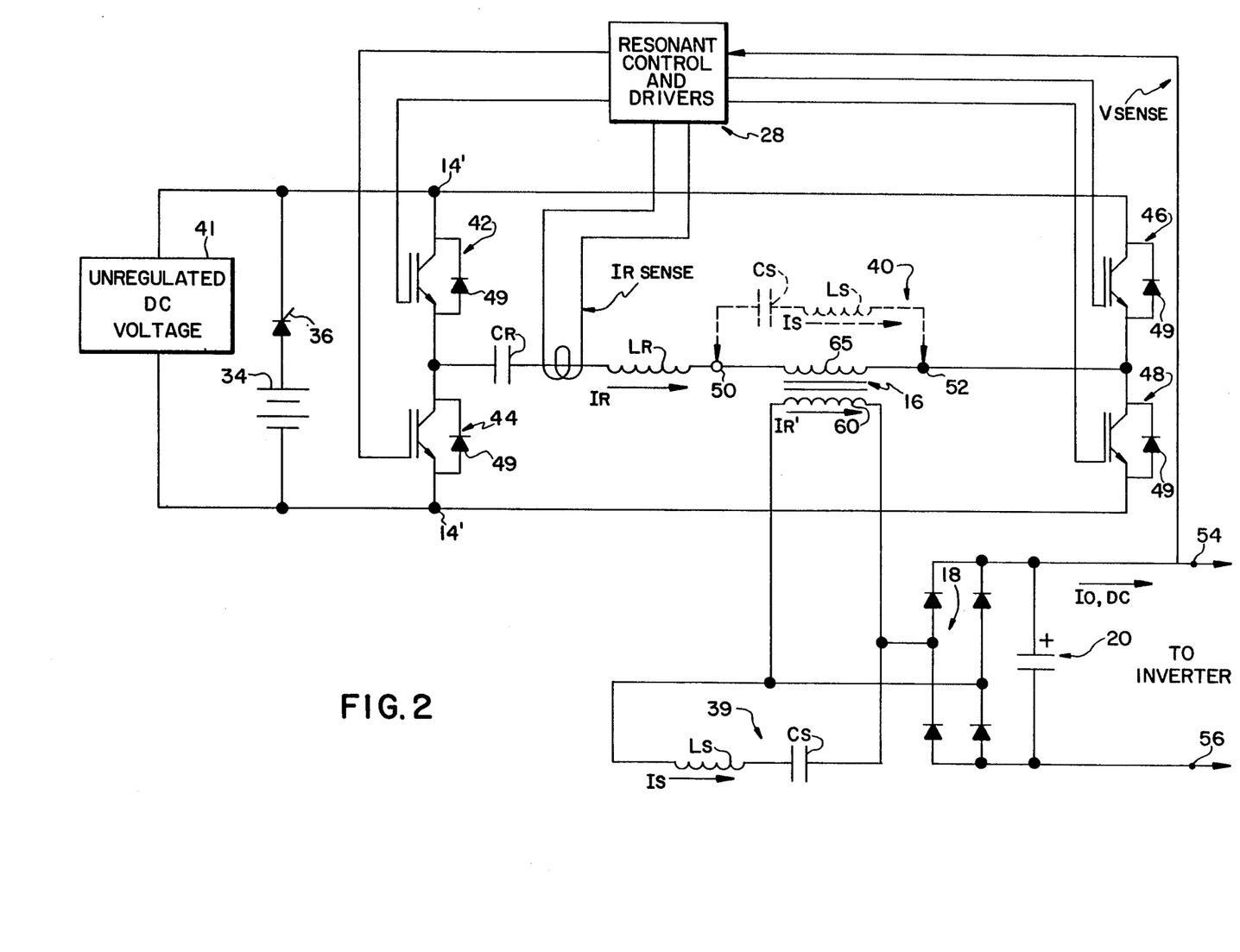
FIG. 2 is a schematic and block diagram showing a resonant converter employing a shunting means in accordance with the invention.

Referring now in FIG. 2, the output of the input filter 12 is depicted in FIG. 2 as the block 41, labeled Unregulated DC Voltage, which is coupled to the input terminals 14' and 14" of the series resonant converter of FIG. 1. The isolation transformer of FIG. 1 is shown generally at 16. The rectifier 18 and output filter 20 of FIG. 1 are, respectively, shown generally at 18 and 20 in FIG. 2 and the current shunt 39 and alternative current shunt 40 of FIG. 1 are likewise, respectively, shown generally at 39 and 40 in FIG. 2. The resonant control and driver block depicted in FIG. 1 is illustrated generally at block 28 in FIG. 2.

The remaining elements shown in FIG. 2 comprise capacitor CR, inductor LR, switch means shown generally at 42, 44, 46 and 48, inductor LS and capacitor CS and battery 34 with its associated switch 36. The switches 42-48 comprise isolated gate power transistors with associates anti-parallel diodes 49.

In operation, series resonant converter 14 receives unregulated DC voltage and provides voltage at terminals 50 and 52 and a regulated DC voltage at terminals 54 and 56 which are connected to the input of inverter 22. The switches 42-48 are arranged in a full bridge configuration with the pair of switches 42 and 48 being turned fully on and off alternately with other pair of switches 44 and 46 with suitable control circuitry 28. Pulses of substantially constant width are applied by the control circuitry 28 to gate electrodes of the switches to turn them on. The frequency at which these pulses are applied determines the level of the resonant current IR which is coupled by the transformer 16 to the output circuit of the converter 14. As the load requirements of the output circuit increase because of loading effect, the operating frequency of the resonant converter 14 will also be increased by the control circuit 28 such that a constant output voltage is maintained across the terminals 55 and 56 and thus across terminals 50 and 52. Such operation is standard and well known to those skilled in the art.

Figure 3:
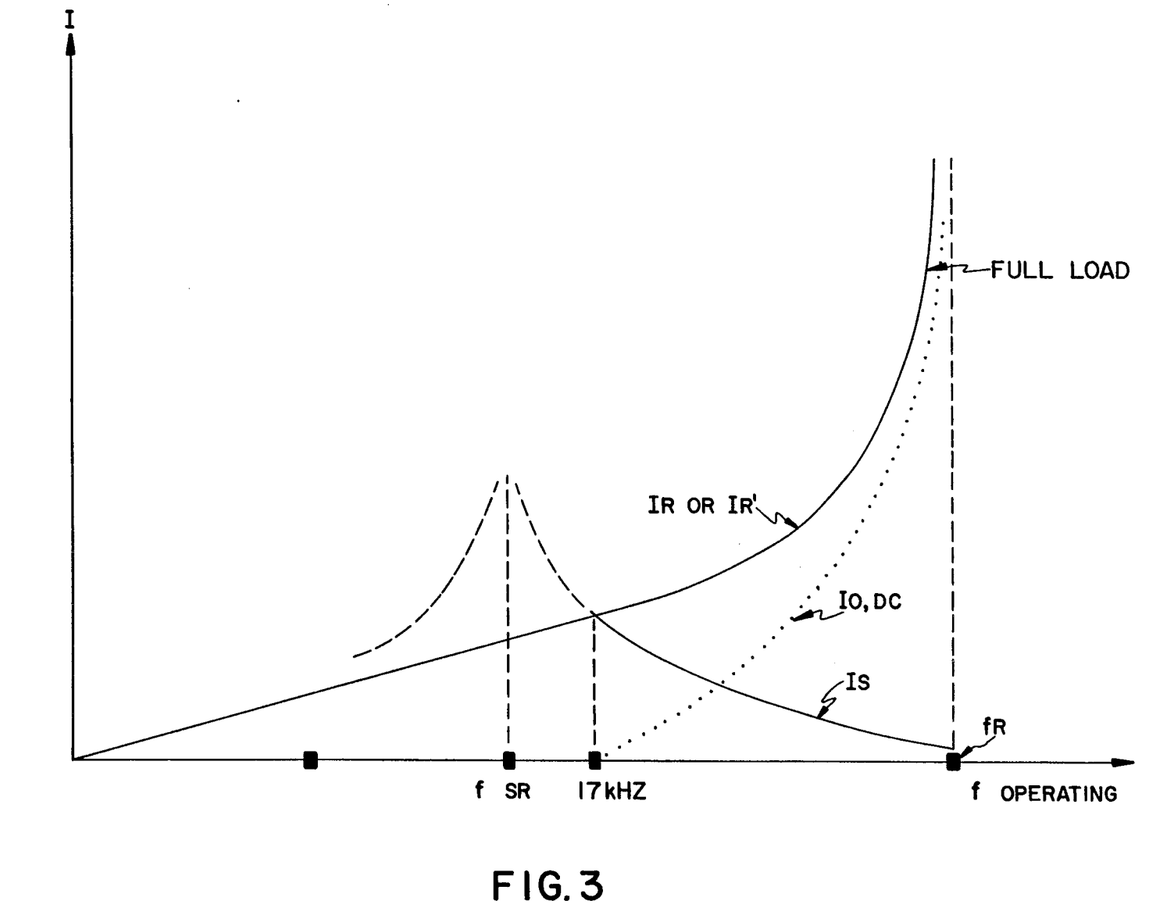
FIG. 3, 3A and 3B are resonance curves useful in describing the invention.
Figure 3A:
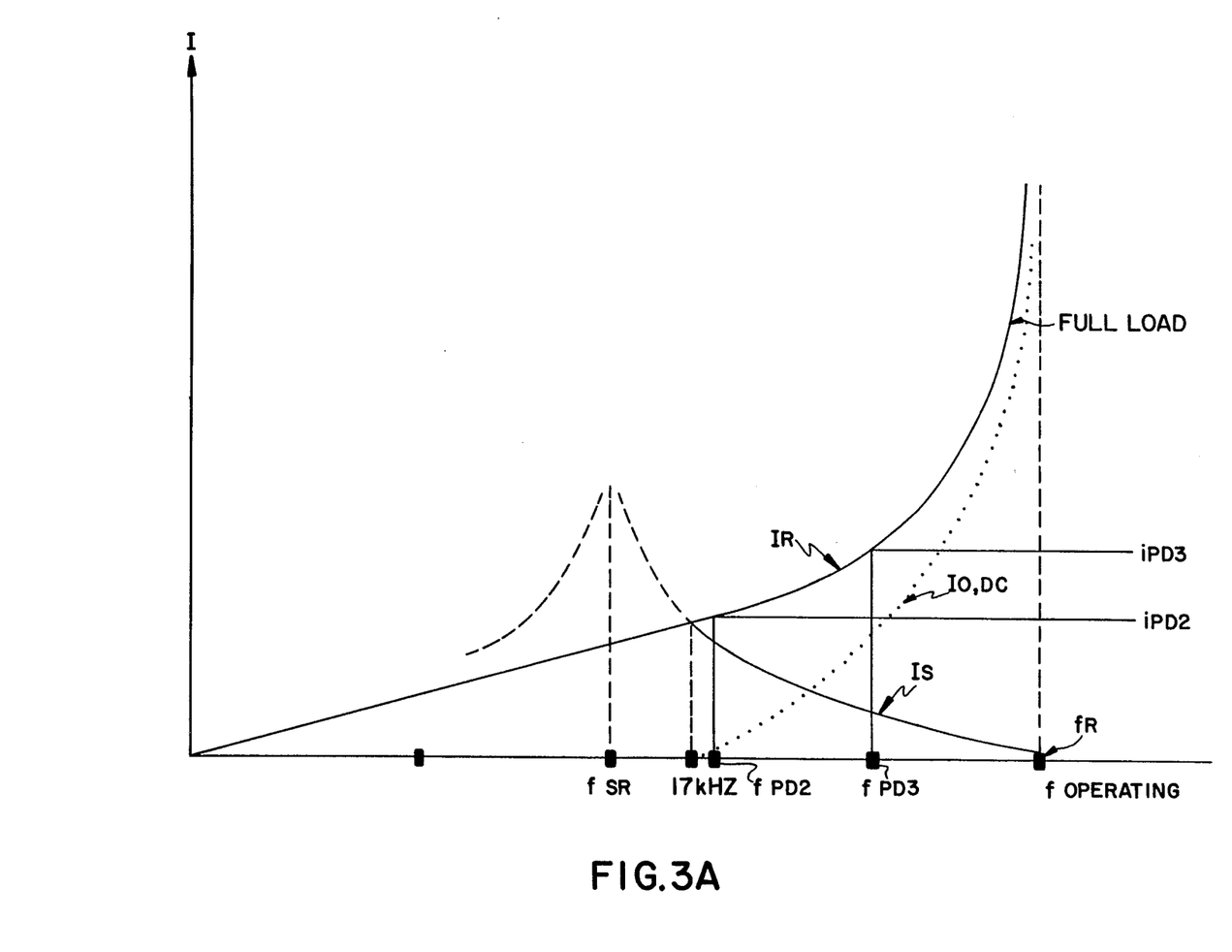

As can be seen in FIG. 3, resonant current IR increases as operating frequency of the resonant converter 14 is increased toward resonant frequency fR. Currents approaching zero as a result of light loading in the output circuit necessitate operating frequencies approaching zero. As the operating frequency moves toward and into the audible range, audible noise will be produced. Applicants have arbitrarily considered 17 kHz as the upper limit of the audible frequency range for purposes of illustration. In order to reduce the net load current to zero without the operating frequency going into the audible range, in accordance with the invention, a current shunting means is provided. The results of providing such a shunting means is illustrated in FIG. 3 by curve IO,DC. As can readily be seen, as the operating frequency approaches a predetermined frequency, i.e., 17 kHz, the net current IO,DC is reduced to zero; while under full load conditions, i.e., operating frequencies approaching resonant frequency fR, it rises nearly as high as IR.

Referring now to FIGS. 2 and 3, the shunting means 39 comprises a resonant circuit which comprises the series combination of inductor LS and capacitor CS connected in parallel with the secondary winding 60 of transformer 16. The resonant frequency fSR of the shunting means 39 is chosen to be appropriately less than the predetermined frequency at which zero output current is desired. This will result in a portion of the transformed resonant current IR' being shunted away from the load thereby reducing the net load current IO,DC. In other words, IO,DC equals IR-IS. As can readily be seen in FIG. 3, with the appropriate selection of values, IO,DC can be reduced to zero as the operating frequency of the converter 14 is reduced to the predetermined frequency, in the example given, 17 kHz. It is desirable that the control circuit 28 limit the minimum operating frequency of the converter 14 to fSR to avoid stability problems.

From the foregoing, it will be understood to those skilled in the art that the shunting means 39 is coupled to the resonant converter 14 for automatically shunting a portion (IS) of the current (IR) flowing in the resonant converter 14 as the loading of the output circuit decreases and the operating frequency of the converter 14 moves or in this case falls toward the predetermined frequency (i.e., 17 kHz) such that the output current (IO,DC) flowing in the output circuit would be reduced to zero if the operating frequency moves or falls to the predetermined frequency. In such a situation all of the current flowing in the resonant converter 14 would pass through the shunt means 39.

Also depicted in FIG. 2 is an alternative location for the shunt means 39 shown in dashed lines generally at 40. In this location the shunt means is connected in parallel with the primary winding 65 of the transformer 16. All of the foregoing description regarding FIG. 3 is equally applicable to this location for the shunt means 39.

Figure 4A:
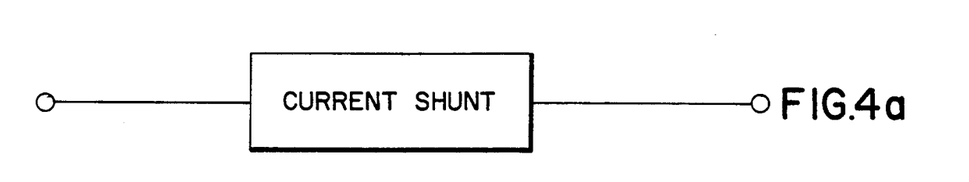
FIG. 4(a), (b) and (c) illustrate various alternative shunting means in accordance with the invention.
Figure 4B:
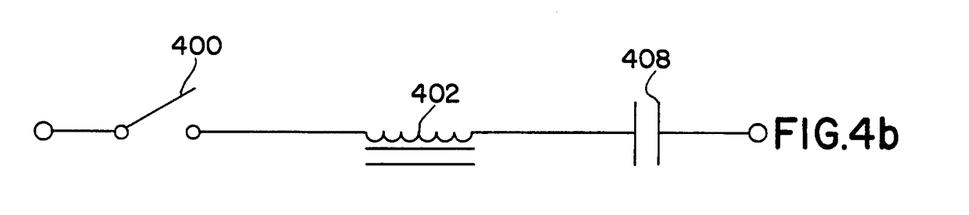
Figure 4C:
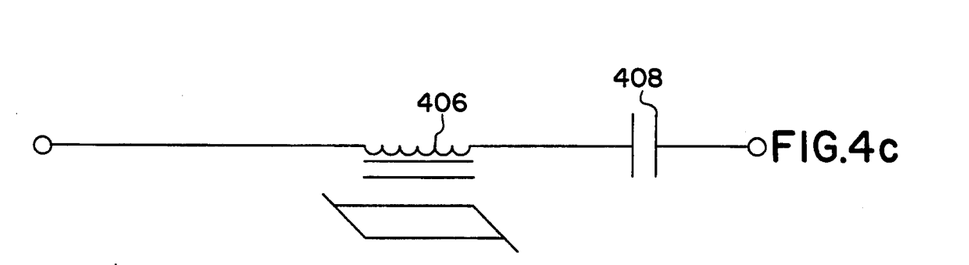

Referring now to FIG. 4, there is illustrated in FIG. 4(a) a generalized current shunt in accordance with the invention. As indicated above, the current shunt, in the preferred embodiment, comprises a series arrangement of an inductive element LS and a capacitor Cs. As depicted in FIG. 4(b), the shunt means comprises the series combination of a switch 400, an inductive element 402 and a capacitor 403. As depicted in FIG. 4(c), the shunt means comprises a series arrangement of a swinging inductor 406 and a capacitor 408.

Figure 2A:
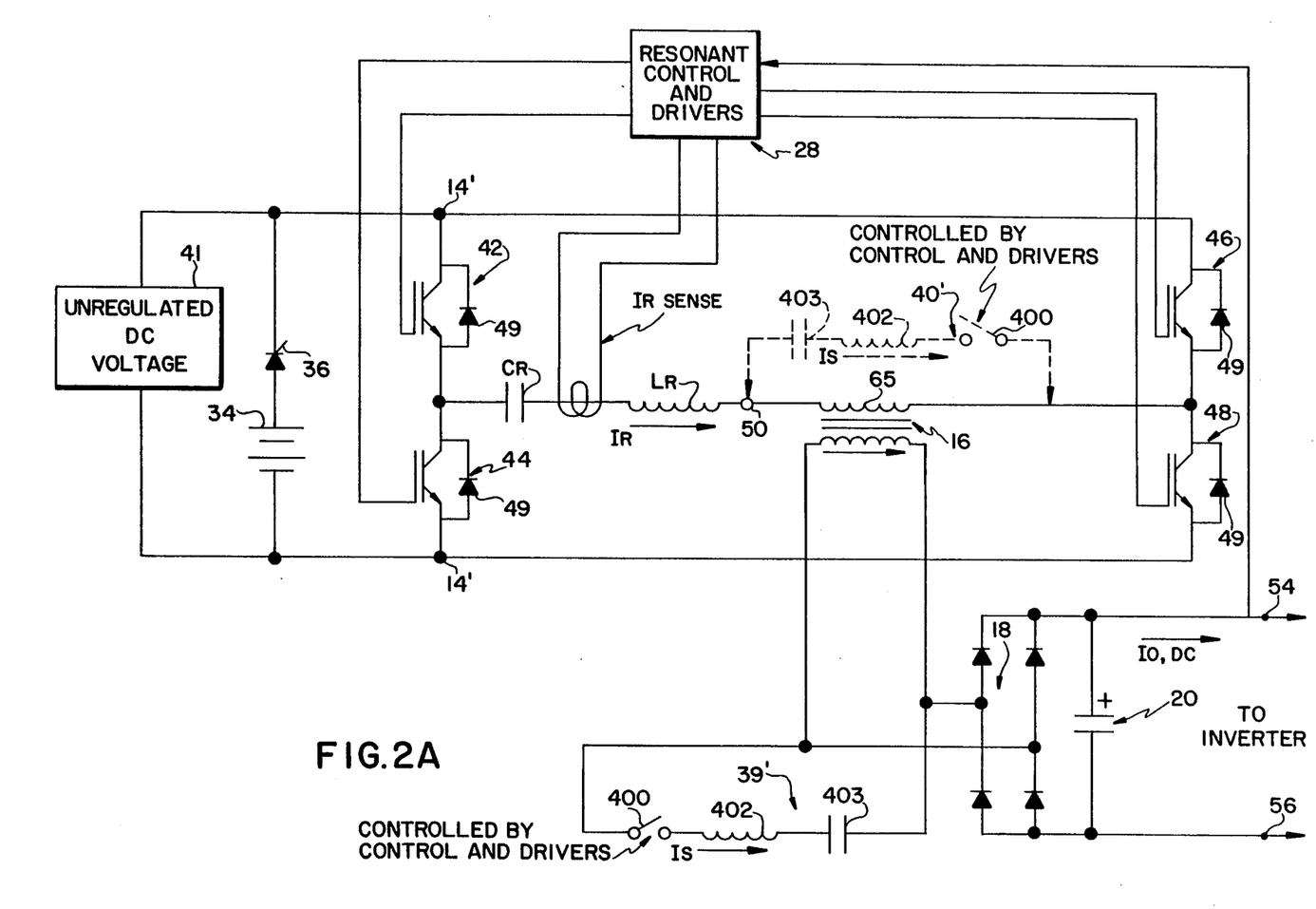
FIG. 2A is a schematic and block diagram similar to FIG. 2 but illustrating an alternate shunting means in accordance with the invention.

Referring now to FIG. 2A, this figure is substantially identical to FIG. 2 with the exception that the shunt means 39' is illustrated as that shown in FIG. 4(b). In this embodiment, the shunting means 39' is switched in by switch means 400 under the control of the control and driver circuitry 28 in response to operating frequency or current of the series resonant converter falling to a second predetermined frequency fPD2 (see FIG. 3A) or current iPD2 and below a third predetermined frequency fPD3 or current iPD3. It will be switched out or decoupled when the operating frequency or current rises to the third predetermined frequency fPD3 or current iPD3. In this manner, the shunting means 39' is switched in and out appropriately so as to allow stable operation and avoid instability. This permits obtaining the desired advantages of the invention at light loads and lower operating frequencies while not interfering with normal operation at high loading or toward the resonant frequency. As in FIG. 2, the shunting means 39' may be placed in parallel with either the primary or secondary windings of the transformer 16 as shown generally at 40'.

Figure 3B:
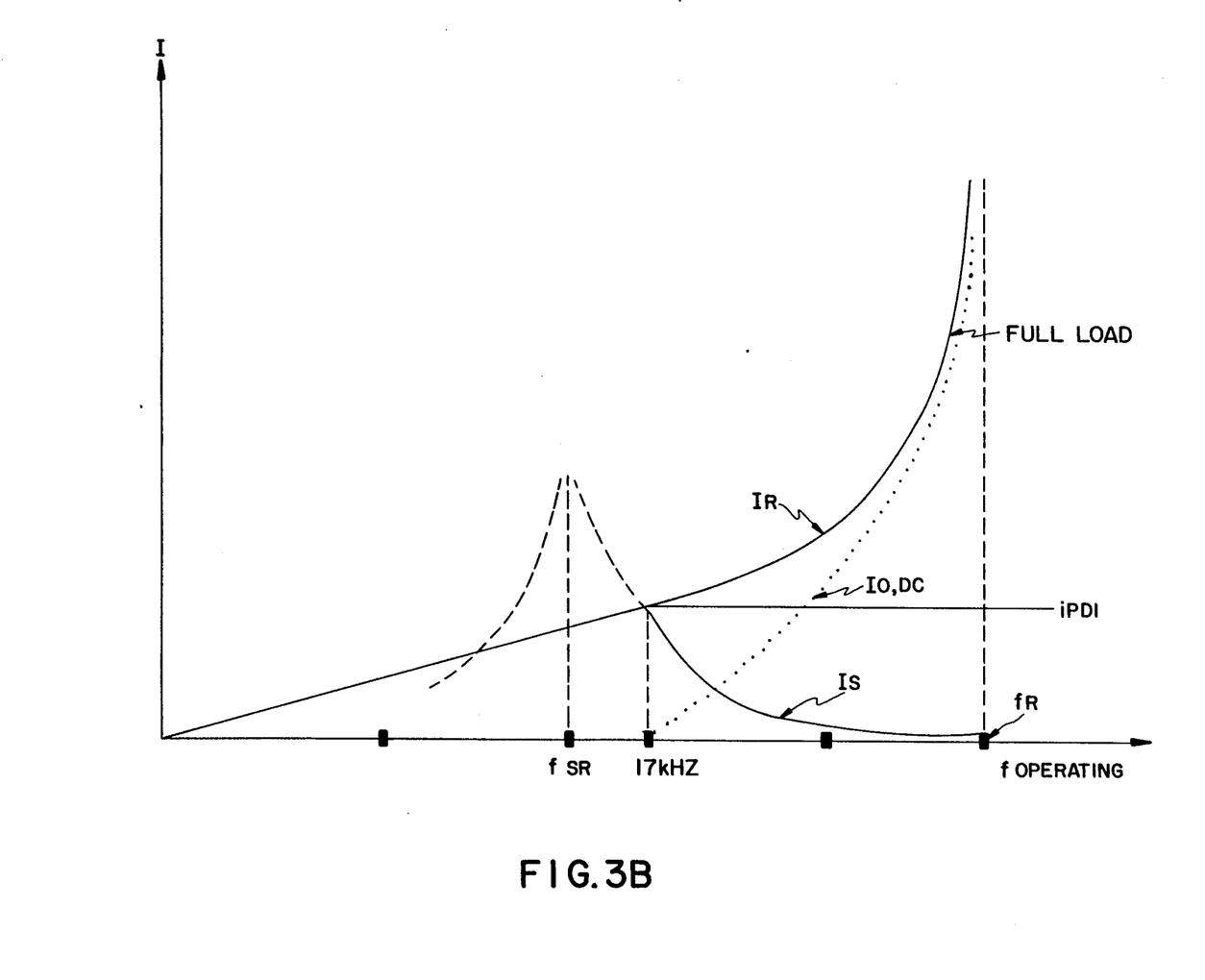

Referring now to FIGS. 4(c) and 3B, the shunt means shown in 4(c) comprises a series arrangement of a swinging inductor 406 and a capacitor 408. This version of the shunt means may also be placed in parallel with either the primary or secondary winding of the transformer 16. The shunt means of FIG. 4(c) is somewhat similar to that of FIG. 4(b), however, it avoids the use of the switch means 400 of the shunt means of FIG. 4(b). The shunt means of FIG. 4(c) takes advantage of the natural swinging effect of such inductors to enhance the ability of the shunt means to reduce the current IODC to zero at the predetermined frequency, i.e., 17 kHz, while allowing the output current IODC to more closely approach the resonant current IR of the converter at higher loads and higher frequencies as shown in FIG. 3B. The swinging inductor 406 in the shunt circuit is chosen o designed in order that its inductance at iPD1, (see FIG. 3B) is substantially the same as the inductance LS of FIG. 2 with iPD1 being the shunted current at the predetermined frequency, i.e. 17 kHz. The swinging inductor 406 is further designed so that its inductance increases substantially as the level of the current passing through it decreases. In this manner, the amount of current shunted away from the load is further reduced at the higher operating frequencies which correspond to higher load levels. Therefore, the shunt means incorporating the swinging inductor 406 allows higher efficiencies to be achieved as full loading is approached.

As will be understood to those skilled in the art, while the description of the present invention has been directed to resonant or series resonant converters operating below the resonant frequency, it will be obvious to those skilled in the art that the concepts and techniques of the invention are equally applicable to operation above the resonant frequency and with parallel or other resonant converters. With regard to the operation above the resonant frequency, the predetermined operating frequency at which the net output current goes to zero would be greater than the resonant frequency.

While the invention has been described in detail herein in accord with certain embodiments thereof, many modifications and changes therein may be effected by those skilled in the art. As for example, operation without an isolation transformer, with other power switching devices and in systems other than UPS systems, are contemplated by the applicants. Accordingly, it is intended by the appended claims to cover all such modifications and changes as fall within the true spirit and scope of the invention.

We claim:

1. A power supply for supplying power to an output circuit comprising:
   a resonant converter having an operating frequency which increases with increases in load current delivered to the output circuit by the power supply, the load current flowing through said resonant converter to the output circuit; and,
   nondissipative shunting means coupled in parallel relative to said output circuit for automatically maintaining a current flow through said resonant converter above a level required to maintain the operating frequency above a predetermined frequency irrespective of the level of the load current, the shunting means shunting a variable portion of the current flowing in said resonant converter as the load current varies, the current shunted by said shunting means decreasing toward zero as said load current increases, and the current shunted by the shunting means increasing as said load current decreases and as said operating frequency moves toward said predetermined frequency such that the load current flowing in said output circuit would be reduced toward zero as said operating frequency moves to said predetermined frequency.

2. A power supply according to claim 1 wherein said operating frequency is between the resonant frequency of said converter and said predetermined frequency.

3. A power supply according to claim 1 wherein said shunting means comprises a series arrangement of an inductive element and a capacitor.

4. A power supply for supplying power to an output circuit comprising:
   a series resonant converter having an operating frequency which increases with increases in load current delivered to the output circuit by the power supply, the load current flowing through said resonant converter to the output circuit; and,
   nondissipative shunting means coupled in parallel relative to said output circuit for automatically maintaining a current flow through said resonant converter above a level required to maintain the operating frequency above a predetermined frequency irrespective of the level of the load current, the shunting means shunting a variable portion of the current flowing in said resonant converter as the load current varies, the current shunted by said shunting means decreasing toward zero as said load current increases, and the current shunted by the shunting means increasing as said load current decreases and as said operating frequency decreases toward said predetermined frequency such that the load current flowing in said output circuit would be reduced toward zero as said operating frequency decreases to said predetermined frequency.

5. A power supply according to claim 4 wherein said operating frequency is between the resonant frequency of said converter and said predetermined frequency.

6. A power supply according to claim 4 wherein said shunting means comprises a series arrangement of an inductive element and a capacitor.

7. A power supply according to claim 6 wherein said inductive element and capacitor comprise a series resonant circuit having a resonant frequency below said predetermined frequency.

8. A power supply according to claim 4 wherein said shunting means comprises a series combination of a switch means, an inductor and capacitor, and switch control means operatively connected to said switch means for coupling said inductor and capacitor to said output circuit in response to said operating frequency falling to a second predetermined frequency above said first predetermined frequency and below a third predetermined frequency and for decoupling said inductor and capacitor from said output circuit in response to said operating frequency rising to said third predetermined frequency.

9. A power supply according to claim 4 wherein said shunting means comprises a series combination of a switching means, an inductor and capacitor, and switch control means operatively connected to said switch means for coupling said inductor and capacitor to said output circuit in response to the converter current falling to a first predetermined current and for decoupling said inductor and capacitor from said output circuit in response to said converter current rising to a second predetermined current.

10. A power supply according to claim 4 wherein said inductive element comprises a swinging inductor.

11. A power supply according to claim 4 wherein said resonant converter further comprises a isolation transformer having a primary and a secondary winding, said transformer coupling said output circuit to said converter, said shunt means being connected in parallel with said secondary winding.

12. A power supply according to claim 11 wherein said shunting means comprises a series arrangement of an inductive element and a capacitor.

13. A power supply according to claim 12 wherein said inductive element and capacitor comprise a series resonant circuit having a resonant frequency below said predetermined frequency.

14. A power supply according to claim 4 wherein said converter further comprises an isolation transformer having a primary and secondary winding, said shunt means being connected in parallel with said primary winding.

15. A power supply according to claim 4 wherein said output circuit comprises an inverter.

16. A UPS system for supplying AC power to a load comprising:

rectifier means connectable to an AC utility power source;

a series resonant converter coupled to said rectifier means and having an operating frequency which varies directly with variations of load current delivered to an output circuit by the power supply, at least a portion of the load current flowing through said resonant converter, said output circuit comprising an invertor connectable to a load for supplying AC power to said load;

a battery connectable to the input of said converter;

said converter further including an isolation transformer having a primary and a secondary winding, said transformer coupling said output circuit to said converter, and nondissipative shunting means connected in parallel relative to one of said primary or secondary windings for automatically maintaining a current flow through said resonant converter above a level required to maintain the operating frequency above a predetermined frequency irrespective of the level of the load current, the shunting means shunting a variable portion of the resonant current flowing in said converter as the load current varies, the current shunted by the shunting means decreasing toward zero as said load current increases, and the current shunted by the shunting means increasing as said load current decreases and as said operating frequency falls toward said predetermined frequency such that said load current flowing in said output circuit would be reduced toward zero as said operating frequency falls to said predetermined frequency.

17. A UPS system according to claim 16 wherein said operating frequency is between the resonant frequency of said converter and said predetermined frequency with said predetermined frequency being less than said resonant frequency.

18. A UPS system according to claim 17 wherein said shunting means comprises a series arrangement of an inductive element and a capacitor.

19. A UPS system according to claim 18 wherein said inductive element and capacitor comprise a series resonant circuit having a resonant frequency below said predetermined frequency.

20. A UPS system for supplying AC power to a load comprising:

rectifier means connectable to an AC utility power source;

a series resonant converter coupled to said rectifier means and having an operating frequency which varies directly with the loading of an output circuit, said output circuit comprising an inverter connectable to a load for supplying AC power to said load;

a battery connectable to the input of said converter;

said converter further including an isolation transformer having a primary and a secondary winding, said transformer coupling said output circuit to said converter, and shunting means connected in parallel with said primary winding for automatically shunting a portion of the resonant current flowing in said converter as said operating frequency falls toward a predetermined frequency such that said output current flowing in said output circuit would be reduced toward zero as said operating frequency falls to said predetermined frequency.

21. A UPS system according to claim 2 wherein said shunting means comprises a series arrangement of an inductor element and a capacitor, said inductor element and capacitor comprising a series resonant circuit having a resonant frequency below said predetermined frequency.

22. A UPS system for supplying AC power to a load comprising:

rectifier means connectable to an AC utility power source;

a series resonant converter coupled to said rectifier means and having an operating frequency which varies directly with the loading of an output circuit, said output circuit comprising an invertor connectable to a load for supplying AC power to said load;

a battery connectable to the input of said converter;

said converter further including an isolation transformer having a primary and a secondary winding, said transformer coupling said output circuit to said converter, and shunting means connected in parallel with one of said primary or secondary windings for automatically shunting a portion of the resonant current flowing in said converter as said operating frequency falls toward predetermined frequency such that said output current flowing in said output circuit would be reduced toward zero as said operating frequency falls to said predetermined frequency, said shunting means comprising a series arrangement of an inductive element and a capacitor, said operating frequency being between a resonant frequency of said converter and said predetermined frequency with said predetermined frequency being less than said resonant frequency.

23. A UPS system according to claim 22 wherein said inductive element and capacitor comprise a series resonant circuit having a resonant frequency below said predetermined frequency.

* * * * *

UNITED STATES PATENT AND TRADEMARK OFFICE
CERTIFICATE OF CORRECTION

PATENT NO. : 5,057,698

DATED : October 15, 1991

INVENTOR(S) : Widener et al.

It is certified that error appears in the above-identified patent and that said Letters Patent is hereby corrected as shown below:

Column 1, Line 26 - "A" should be typed as "As".

Column 4, Line 63 - "o" should be typed as "or".

Column 6, Line 49 - "4" should be typed as "6".

Column 8, Line 17 - "2" should be typed as "20".

Signed and Sealed this

Second Day of March, 1993

Attest:

STEPHEN G. KUNIN

Attesting Officer

Acting Commissioner of Patents and Trademarks

UNITED STATES PATENT AND TRADEMARK OFFICE
CERTIFICATE OF CORRECTION

PATENT NO. : 5,057,698

DATED : OCTOBER 15, 1991

INVENTOR(S) : STEVEN R. WIDENER and GEORGE W. OUGHTON

It is certified that error appears in the above-identified patent and that said Letters Patent is hereby corrected as shown below:

On title page of patent, the inventors should read as:
George W. Oughton and Steven R. Widener Signed and Sealed this Sixteenth Day of March, 1993

Attest:

STEPHEN G. KUNIN

*Attesting Officer*　　　Acting Commissioner of Patents and Trademarks